(12) United States Patent
Dudley

(10) Patent No.: US 10,034,172 B2
(45) Date of Patent: Jul. 24, 2018

(54) FACILITATION OF USER AUTHENTICATION USING MOBILE DEVICES

(71) Applicant: SAP SE, Walldorf (DE)

(72) Inventor: William Dudley, Lovettsville, VA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/390,985

(22) Filed: Dec. 27, 2016

(65) Prior Publication Data

US 2018/0184289 A1 Jun. 28, 2018

(51) Int. Cl.
| | |
|---|---|
| H04M 1/66 | (2006.01) |
| H04W 12/06 | (2009.01) |
| H04L 29/08 | (2006.01) |
| H04W 8/26 | (2009.01) |
| H04W 88/04 | (2009.01) |

(52) U.S. Cl.
CPC ............. H04W 12/06 (2013.01); H04L 67/02 (2013.01); H04L 67/10 (2013.01); H04W 8/26 (2013.01); H04W 88/04 (2013.01)

(58) Field of Classification Search
CPC ....... H04W 12/06; H04W 88/08; H04W 8/26; H04L 67/02; H04L 67/10
See application file for complete search history.

(56) References Cited

U.S. PATENT DOCUMENTS

| 9,877,190 | B1 * | 1/2018 | Gailloux | H04W 12/06 |
| 2012/0005589 | A1 * | 1/2012 | Han | H04L 63/168 |
| | | | | 715/741 |
| 2014/0051391 | A1 * | 2/2014 | Torres | H04W 12/06 |
| | | | | 455/411 |

\* cited by examiner

*Primary Examiner* — Kathy Wang-Hurst
*Assistant Examiner* — Said M Elnoubi
(74) *Attorney, Agent, or Firm* — Brake Hughes Bellermann LLP

(57) ABSTRACT

A connection hub connects a plurality of service providers and a plurality of mobile operators, and facilitates authentication of service consumers on behalf of the plurality of service providers. The connection hub may use authentication information of the plurality of mobile operators, to thereby enable provision of network resources from the plurality of service providers to the service consumers. The connection hub may include an operator discovery engine configured to access a number resolution service and match a telephone number of a mobile device of the service consumer with a corresponding mobile operator of the plurality of mobile operators, and an operator interface configured to forward the authentication request to the corresponding mobile operator, for use of the telephone number and the mobile device in completing an authentication of the service consumer at the service provider, and associated provision of a corresponding network resource to the service consumer.

14 Claims, 5 Drawing Sheets

FACILITATION OF USER AUTHENTICATION USING MOBILE DEVICES

TECHNICAL FIELD

This description relates to user authentication for accessing network resources.

BACKGROUND

Many service providers provide their corresponding services to users over a network, such as the public Internet. As the users consume these services, it is often necessary or useful for the users to provide the service providers with confidential information, such as financial information, purchase histories, and other personal data. More generally, the service providers often wish to distinguish individual users (or user accounts) uniquely, for purposes including, e.g., marketing available services, or providing users with services for which those users have paid.

Thus, it is often necessary for service providers to authenticate users, and thereby establish an identity or role of a user, and provide corresponding, appropriate access to authorized network resources. Accordingly, many different authentication techniques have been developed, and these include the use of a username/password combination, as well as various biometric techniques (e.g., fingerprint analysis).

Each of the existing authentication techniques have advantages and disadvantages, in terms of, e.g., level of security, availability, expense, and/or required hardware/software. For example, username/password combinations require users to establish and remember information, often for a number of different service providers, while a service provider(s) is often required to store the username/password combinations securely for many different users. Biometric techniques may be secure, and easy for a user to implement, but may require hardware that may be expensive and/or unavailable to particular users. Consequently, for these and other reasons, further improvements are desirable in the field of user authentication for accessing network resources.

SUMMARY

Techniques relate to the use of a connection hub as an interface between a plurality of service providers and a plurality of network/mobile operators. As the mobile operators already have access to authentication information for each of its subscribers, the mobile operators are enabled to act as curators of such authentication information on behalf of the service providers using the connection hub, and for the convenience of the subscribers. In particular, when the subscribers subscribe to telephone and other mobile device-based network services, the mobile operators have access to, and may leverage, the possession of these mobile devices during the authentication process. The described connection hub may utilize a number resolution service to allow for the fast and accurate identification of a mobile operator, using a telephone number of a user requesting access at the service provider. Accordingly, the service providers may hand off the authentication process to the appropriate mobile operator, and are unburdened from providing authentication services themselves, and may simply register with the connection hub instead. Similarly, the mobile operators may simply register with the connection hub to implement the authentication techniques described herein. Meanwhile, for the subscribers or other users, the burdens associated with authentication are greatly reduced, as well.

The details of one or more implementations are set forth in the accompanying drawings and the description below. Other features will be apparent from the description and drawings, and from the claims.

DETAILED DESCRIPTION

Figure 1:
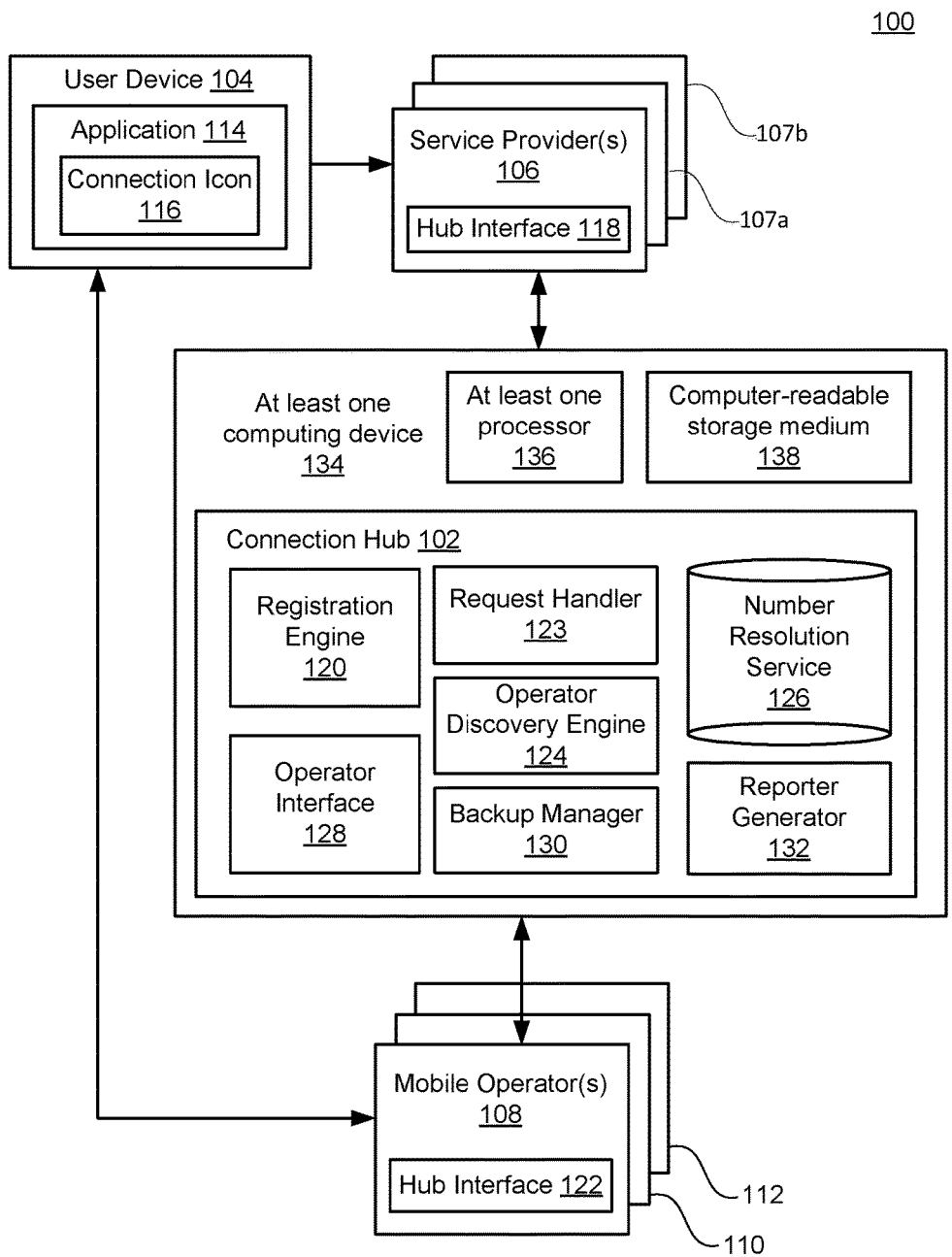
FIG. 1 is a block diagram of a system for facilitating user authentication using mobile devices.

FIG. 1 is a block diagram of a system 100 providing a connection hub 102 for facilitating user authentication using mobile devices. More particularly, in FIG. 1, a user device 104 is illustrated as interacting with a service provider 106 to obtain a network resource from the service provider 106. As described in detail below, the service provider 106 may utilize the connection hub 102 to facilitate an identification, selection, and use of an appropriate mobile operator 108 from among a plurality of mobile operators 108, 110, 112. In this way, as referenced above and described in more detail below, the mobile operator 108 may utilize authentication information for the user device 104 that is already available to the mobile operator 108, due to an existing service relationship between the mobile operator 108 and the user of the user device 104.

Accordingly, a burden on a user of the user device 104 associated with authenticating his or her identity may be reduced, even when the user is authenticating across a plurality of service providers. Similarly, each of the service providers 106, 107a, 107b will be relieved of many of the burdens and responsibilities associated with authenticating individual users. Further, although the mobile operator 108 may retain much of the burden of providing authentication services, the mobile operator 108 may generally do so using resources that are already available to the mobile operator 108, and the mobile operator 108 will receive a number of benefits and advantages from providing authentication services in the context of the system 100 of FIG. 1, as described in detail, below.

In the example of FIG. 1, the user device 104 may represent, for example, virtually any mobile device, and/or any device that is associated with a telephone number or other unique identifier provided by the mobile operator 108. The user of the user device 104 is understood to have a service relationship with the mobile operator 108, such as when the mobile operator 108 provides telephone service, messaging service, internet service, or any service provided by way of one or more wireless networks. Thus, by way of non-limiting example, the user device 104 may include a cell phone, smartphone, tablet, or other mobile device.

As referenced and illustrated, the user device 104 may be utilized to interact with a plurality of service providers, in order to obtain various network resources. For example, the service provider 106 might represent a provider of a commercial website, (e.g., a retail website). More generally, the service provider 106 might represent any provider of a website over the public internet, or a private network. For example, the service provider 106 might represent an employer of a user of the user device 104, or a governmental or nonprofit entity.

In the context of interacting with one another, both the user of the user device 104 and the various service providers bear a number of burdens related to a need for authentication of the user. From the perspective of the user, it is difficult to remember, store, access, secure, and otherwise utilize the plurality of types of authentication requirements needed to access a plurality of service providers individually. For example, service providers managing authentication directly might require one or more of a number of different types of authentication techniques, including, for example, username/password combinations, as well as fingerprint analysis and various other types of biometric authentication techniques. If interacting and authenticating with the various service providers directly, the user of the user device 104 would be forced to find some way to remember and implement corresponding authentication requirements for each service provider, and would be inconvenienced when failing to do so in any particular instance (such as when the user must undergo a password recovery process after forgetting a current password).

Meanwhile, it is also burdensome, inconvenient, and risky for the various service providers to provide authentication directly to the various users of each service provider. For example, a service provider providing authentication directly to a large number of users must generally store corresponding authentication information in a manner that is highly secure. Moreover, the service provider 106 must anticipate that at least some of the various users may experience difficulties when authenticating using conventional techniques (such as in scenarios in which a user's password is forgotten and must be recovered, as just referenced), so that the various service providers must also consume resources to provide assistance to such users.

Nonetheless, it is often important or necessary for the service provider 106 to authenticate a user of the user device 104. For example, the service provider 106 may need to uniquely distinguish the user of the user device 104 from among a large number of users, e.g., in order to provide individual account access for the user. Further, the service provider 106 may store or access private information of the user of the user device 104, such as credit card or other financial information, or various other types of personal information.

Therefore, in the example of FIG. 1, the connection hub 102 is configured to facilitate interactions between a plurality of service providers, represented by the service provider 106 and the service providers 107a, 107b, and appropriate ones of the mobile operators 108, 110, 112. As referenced above, and described in detail below, each of the mobile operators 108, 110, 112 is assumed to have a base of subscribers or other users who are already uniquely associated with an identifier in the context of an existing service relationship between each such subscriber and the corresponding mobile operator of the mobile operators 108, 110, 112.

For example, when the user device 104 represents a mobile device such as a cell phone or smartphone, then the mobile operator 108 will generally have an existing service contract with the user of the user device 104, and will have assigned and provided a unique telephone number to the user in this context. Accordingly, it will already be incumbent upon the mobile operator 108 to provide a unique account for the user of the user device 104, and to authenticate the user in order to provide secured access to the corresponding account. Consequently, the system 100 enables each of the mobile operators 108, 110, 112 to leverage existing resources and abilities in the context of providing authentication services via the user device 104, and on behalf of one or more of the service providers, 106, 107a, 107b.

For example, in FIG. 1, the user device 104 is illustrated as running an application 114, which may be provided in whole or in part by the service provider 106. For example, as referenced above, the application 114 may include a browser application executing a website and associated functionality provided by the service provider 106.

In order to authenticate with the service provider 106, a connection icon 116 is provided in the context of the application 114. Therefore, in order to authenticate with the service provider 106, the user of the user device 104 may utilize functionality of the connection icon 116 to trigger a desire for authentication to the service provider 106.

As shown, the service provider 106 may have access to a hub interface 118 to interact with the connection hub 102. As described in detail below, it is not necessary for the service provider 106 to identify, or interact with, the mobile operator 108. Instead, the connection hub 102 is configured to utilize the authentication request received by way of the connection icon 116 to identify the mobile operator 108 from among the plurality of mobile operators 108, 110, 112.

Then, the connection hub 102 may communicate with the mobile operator 108 by way of a hub interface 122 at the mobile operator 108, in order to convey the authentication request and any associated information. At this point, the mobile operator 108 may utilize its existing authentication data to identify the user and the user device 104, and may thereafter communicate with the user device 104 to complete the authentication process, using one or more of a number of authentication techniques, some of which are described below.

Thus, the user of the user device 104 obtains a desired or necessary level of authentication, using the user device 104 that is already in a possession of the user. Moreover, the user may utilize such authentication techniques even when interacting across the plurality of service providers 106, 107a, 107b. For example, as illustrated and described below, the connection icon 116 may be a single icon or type of icon that is provided across a number of different types of applications provided by the various service providers 106, 107a, 107b.

In order to provide the above and additional types of services and features, the connection hub 102 is illustrated in the example of FIG. 1 as including a registration engine 120. In general, the connection hub 102 may be designed to utilize the registration engine 120 to provide an onboarding process for registering new service providers in a manner that is easy, fast, and efficient. For example, at an initial operation of the connection hub 102, the registration engine 120 may be utilized to register the service provider 106, and provide the hub interface 118 for use in future interactions between the service provider 106 and the connection hub 102.

In particular, for example, the hub interface 118 may be utilized to enable the service provider 106 to include the connection icon 116 when providing the application 114 at the user device 104. As may be appreciated, the registration engine 120 may then, at the same time or in the future, register one or both of the service providers 107a, 107b, along with any other desired number of service providers that may wish to subscribe for interactions with the connection hub 102.

Similarly, the registration engine 120 may be utilized to register the plurality of mobile operators, represented by the mobile operators 108, 110, 112. As with the various service providers, the registration engine 120 may provide the hub interface 122 with the various mobile operators 108, 110, 112.

Then, at a later time, the user of the user device 104 may access the application 114 and may observe and utilize the connection icon 116 in this context. As may be appreciated, it is not necessary for the user to download or otherwise configure the connection icon 116. Instead, the user may simply receive the connection icon 116 as a function of the hub interface 118, along with one or more instructions for utilizing the connection icon 116 (examples of which are provided below, e.g., with respect to FIG. 2).

Upon selecting the connection icon 116, an authentication request will automatically be forwarded from the user device 104 to the hub interface 118, including a telephone number, or derivative thereof, or other, unique identifier associated with the user device 104 and known to the corresponding mobile operator 108. The service provider 106 may thus forward the authentication request to the connection hub 102, where the authentication request may be received by a request handler 123.

The request handler 123 may provide the telephone number and/or other information from the authentication request to an operator discovery engine 124. The operator discovery engine 124 may then utilize a number resolution service 126 to distinguish the mobile operator 108 from among the plurality of mobile operators 108, 110, 112 as being associated with the telephone number of the user device 104. In this regard, it will be appreciated that mobile operators, such as the mobile operators 108, 110, 112, may generally have a large number of telephone numbers and associated users. Moreover, there may be a relatively large number of such mobile operators wishing to provide connection services in the manner described herein. Consequently, the operator discovery engine 124 is configured to utilize the number resolution service 126 to distinguish the individual, unique telephone number received as part of the authentication request, and associate the telephone number with the corresponding, appropriate mobile operator 108 responsible for providing services in conjunction therewith.

Once determined and selected, the mobile operator 108 may be contacted by way of an operator interface 128, in communications with the hub interface 122 implemented at the mobile operator 108. For example, as described in detail below, the operator interface 128 may provide the telephone number received as part of the authentication request, along with any other authentication requirements that may be stipulated by the relevant service provider 106. For example, when registering with the registration engine 120, the service provider 106 may specify a particular level or type of authentication to be performed, and the operator interface 128 may retrieve such requests or requirements in conjunction with interacting with the hub interface 122. In this way, the desired types of authentication may precede, including direct interactions between the mobile operator 108 and the user device 104, utilizing connection abilities already present by the nature of the user device 104 in the existing service relationship between the mobile operator 108 and the user of the user device 104.

In the example of FIG. 1, a backup manager 130 is illustrated in conjunction with the connection hub 102, it may be configured to provide additional or alternative authentication techniques, such as in scenarios in which the primary authentication techniques described herein are partially or completely unavailable. For example, in some scenarios, it may occur that a particular mobile operator is not yet registered with the connection hub 102, but that the service provider 106 may nonetheless wish to provide at least some level of authentication ability with respect to use of the application 114.

In other scenarios, it may occur that the mobile operator 108 is (at least temporarily) partially or completely unavailable to provide authentication services in the manner described herein. In these and other scenarios, the service provider 106 may nonetheless use the hub interface 118 to provide the connection icon 116, or a similar/alternative icon, in the context of the application 114. That is, as may be appreciated from the present description, the hub interface 118 may be provided by the connection hub 102, irrespective of any particular mobile operator. As a result, the service provider 106 may receive an authentication request from the user device 104, even when the corresponding mobile operator is not registered, or unavailable.

In such scenarios, the backup manager 130 may be configured to determine that the authentication techniques just described may be partially or completely unavailable. For example, the backup manager 130 may be notified that the telephone number received by the request handler 123 in the context of a received authentication request is not available within the number resolution service 126. Alternatively, the operator discovery engine 124 may determine that the received telephone number is available within the number resolution service 126, but that no corresponding mobile operator is currently registered with the connection hub 102 by way of the registration engine 120.

Accordingly, the backup manager 130 may implement one or more of a number of possible backup authentication techniques. For example, the connection hub 102 may provide, or be associated or affiliated with, an independent authentication service, and may execute corresponding authentication procedures. In other scenarios, it may occur that the received telephone number of a particular authentication request is present within the number resolution service 126, but corresponds to a mobile operator that is not currently registered with the connection 102. In such cases, the connection hub 102 may nonetheless utilize its knowledge of the telephone number to communicate directly with the application 114, and thereby provide some level or type of authentication on behalf of the service provider 106.

Further with respect to the connection hub 102, a report generator 132 is illustrated and may be configured to generate a number of different types of reports regarding activities of the connection hub 102, where such reports may be of interest to one or both of the service providers and the mobile operators. For example, the report generator 132 may generate reports for the service provider 106 that detail numbers and types of authentication requests received within a defined time period, even when the authentication request are implemented across of number of the mobile operators 108, 110, 112. Similarly, the report generator 132 may generate a report for the mobile operator 108 that spans authentication services provided on behalf of all of the service providers 106, 107a, 107b. Thus, the system of FIG. 1 provides a number of options and abilities for, e.g., data capture, record keeping, or audit capabilities, in support of, for example, various legal, billing, or other reporting requirements.

In the example of FIG. 1, the connection hub 102 is illustrated as being executed using at least one computing device 134, which itself includes at least one processor 136 and a non-transitory computer readable storage medium 138. In other words, FIG. 1 illustrates that the connection hub 102 may be implemented using appropriate hardware, or appropriate virtual machine executing on such hardware. For example, as described in detail below, the at least one computing device 134 may represent a cloud-based server that is available, e.g., on the public Internet, and that is operable to communicate with either the service providers 106, 107a, 107b, and/or with mobile network operators 108, 110, 112 providing services to the device(s) 104.

Thus, FIG. 1 illustrates that the connection hub 102 may be provided by a third-party provider, such as an inter-operator vendor. The connection hub 102 defines, in example implementations, a new, cloud-based infrastructure to facilitate operator-based authentication for service providers.

Of course, the at least one computing device 134 is merely a highly-simplified, conceptual representation of the types of computing devices that may be utilized to implement the connection hub 102. For example, the at least one computing device 134 may include two or more computing devices in communication with one another. The at least one processor 136 may represent two or more processors of any such computing device, executing in parallel to provide the connection hub 102, utilizing corresponding instructions stored using the non-transitory computer readable storage medium 138. Of course, similarly, the non-transitory computer readable storage medium 138 may represent one or more different types of memory utilized by the at least one computing device 134. In addition to storing instructions which allow the at least one processor 136 to implement the connection hub 102, the non-transitory computer readable storage medium 138 may be used to store data, such as data of the number resolution service 126.

Further, in the example of FIG. 1, the connection hub 102 is illustrated as a single component, which itself includes individual subcomponents 120-132. Of course, it will be appreciated that, in various alternative implementations, any one of the subcomponents 120-132 may be implemented using two or more additional subcomponents, while, conversely, any two of the illustrated subcomponents 120-132 may be implemented as a single subcomponent.

Figure 2:
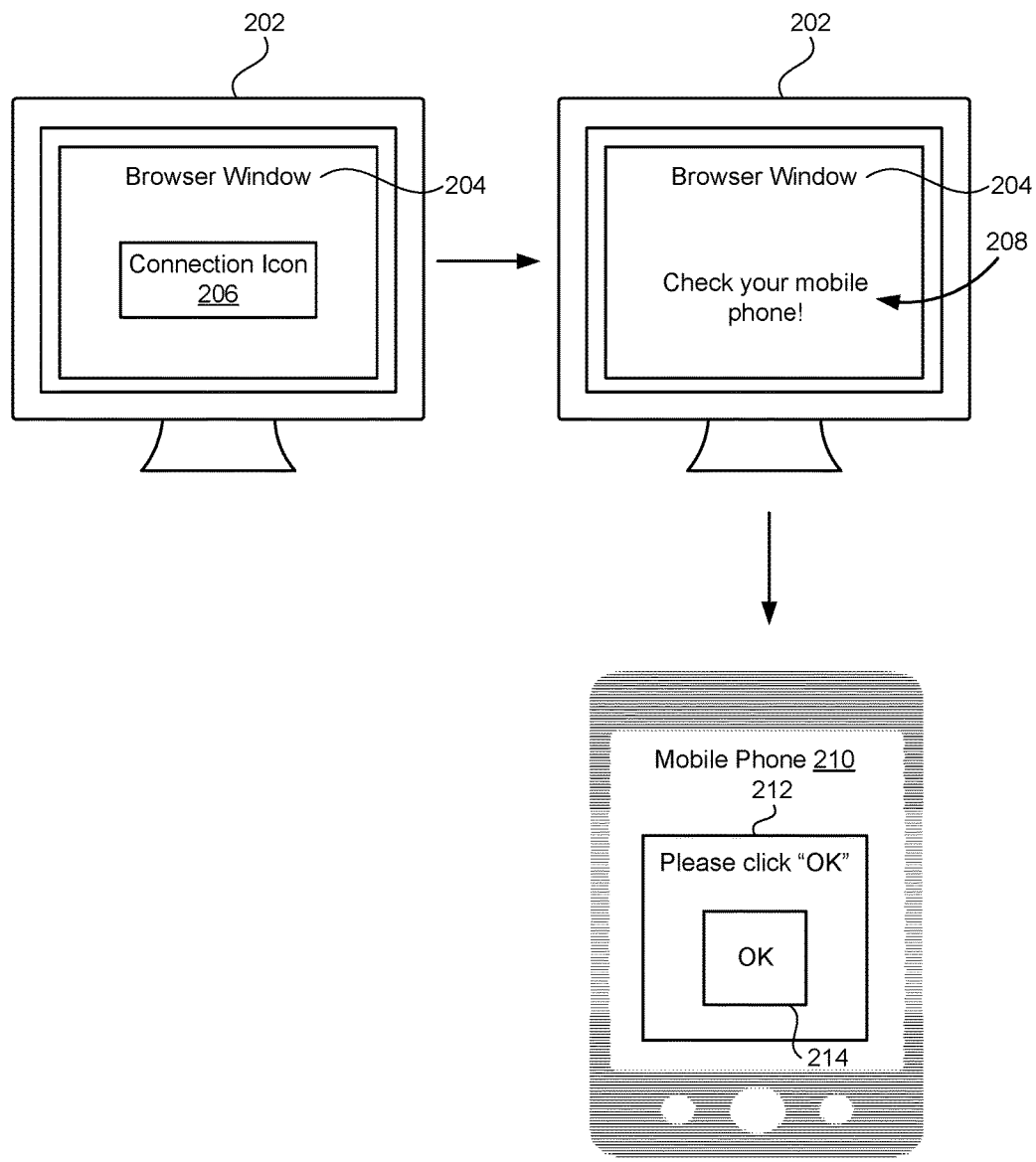
FIG. 2 is a block diagram of screenshots illustrating an example implementation of the system of FIG. 1.

FIG. 2 includes a number of screenshots illustrating a user perspective during a simplified example of operations of the system 100 of FIG. 1. In the example of FIG. 2, it will be appreciated that, although the user device 104 of FIG. 1 is illustrated as a single device, the techniques of FIG. 1 may be implemented across two or more devices.

In particular, as shown in FIG. 2, a computer monitor or screen 202 may be utilized in conjunction with a desktop computing device. As shown, a browser window 204 is provided therein, in conjunction with a connection icon 206, corresponding to the connection icon 116 of FIG. 1.

In order to authenticate with a service provider providing a website in the context of the browser window 204, the user may simply click on, or otherwise select, the connection icon 206, which will then trigger the sending of a corresponding authentication request to the corresponding service provider, as described above with respect to FIG. 1. In scenarios in which the authentication request is initiated separately from a relevant mobile device of the user, the user may be requested to enter his or her telephone number. In scenarios in which the authentication request is initiated from a mobile device, the telephone number may be automatically, e.g., transparently, included in the authentication request.

The described interactions between the relevant service provider, the connection hub 102, and a mobile operator providing mobile services to the user may then proceed. As shown in FIG. 2, from the perspective of the user, a message 208 may be provided that conveys necessary instructions for the user to complete the authentication process. In particular, as shown, the message 208 may instruct the user to "check your mobile phone," whereupon the user may separately observe his or her mobile phone 210. As shown, a display 212 of the mobile phone 210 may provide an icon 214 and associated instructions for completing the authentication process. In particular, as shown, the icon 214 simply includes the response "ok," along with instructions to click the icon 214.

In the example of FIG. 2, it will be appreciated that various additional or optional operations or aspects may be included in various versions of corresponding implementations, which may not be explicitly illustrated or described herein. For example, it may occur that the entire process flow of FIG. 2 may be implemented in conjunction only with the mobile phone 210, such as when the mobile phone 210 includes a Smartphone providing a browser application, and the user simply accesses a website of the service provider and completes associated authentication procedures using only the mobile phone 210. In such scenarios, it may be possible to include or identify the corresponding telephone number of the mobile phone 210 automatically within the corresponding authentication request.

In scenarios such as illustrated in FIG. 2, in which the authentication request is initiated by way of a separate computing device, it may be necessary to provide the relevant telephone number separately. For example, in response to clicking the connection icon 206, the user may be requested to enter a telephone number of a mobile device of the user, in order to generate the authentication request.

Figure 3:
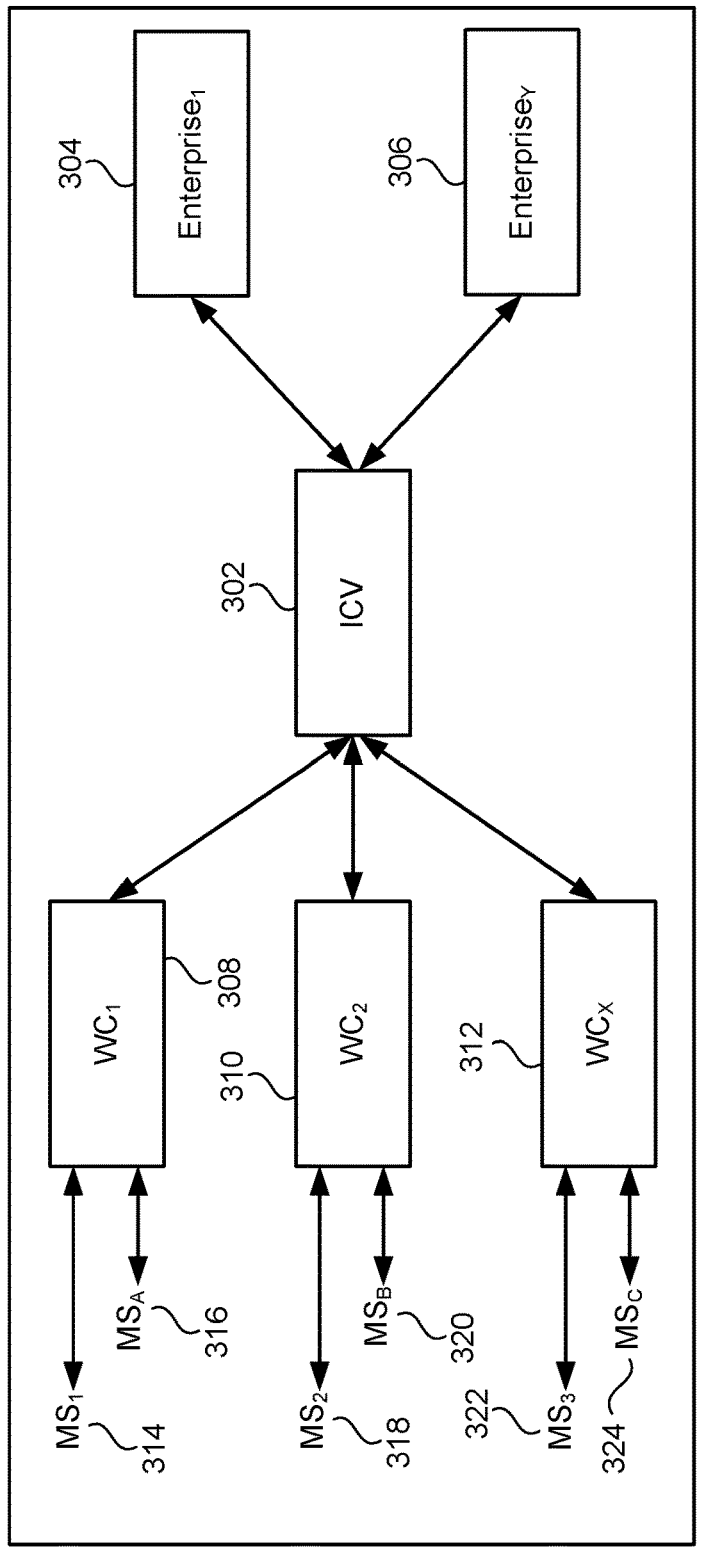
FIG. 3 is a block diagram illustrating a further example implementation of the system of FIG. 1.

FIG. 3 is a block diagram of an example implementation of the system 100 of FIG. 1. In the example of FIG. 3, an inter-carrier vendor (ICV) 302 is illustrated as implementing the connection hub 102 of FIG. 1, or an implementation thereof.

As shown, the ICV 302 connects at least two enterprises 304, 306, and is connected to a plurality of wireless carriers (representing examples of the mobile operators 108, 110, 112 of FIG. 1), illustrated in FIG. 3 as $WC_1$ 308, $WC_2$ 310, and $WC_X$ 312. As further illustrated in the example of FIG. 3, the wireless carrier WC1 308 is illustrated as having a mobile subscriber ($MS_1$) 314, as well as a mobile subscriber $MS_A$ 316. Meanwhile, the wireless carrier 310 is illustrated as having a mobile subscriber $MS_2$ 318, and a mobile subscriber $MS_B$ 320. Finally in FIG. 3, the wireless carrier WCX 312 is illustrated as having a mobile subscriber $MS_3$ 322, and a mobile subscriber $MS_C$ 324.

As may be appreciated from the above description, and from FIG. 3, the ICV 302 thus provides a hub or intermediary model, in which the various entities (e.g., wireless carriers or operators, service providers, content providers, and various other entities, may establish a single connection to the centralized ICV 302, and in exchange the various forms of data described herein with one or more of the various entities connected to the ICV 302). Thus, the ICV 302 provides a single access point to which different entities may connect, minimizing or obviating a cost, complexity, and inefficiency that would arise if each entity were required to establish and manage direct connectivity with each of the other entities using a symmetrical, many-to-many model. Further, the ICV is positioned and configured to provide a range of processing activities including, for example, network balancing, protocol adaptations (e.g., IP-based, or SS7-based), data validation or transformation operations, authoritative address resolutions, routing, queuing, billing, and reporting, to name a few examples. Thus, for example, each enterprise 304, 306 may need to support only a single communications protocol to interact with the ICV 302.

In implementation, the ICV 302 may be provided using any number of delivery paradigms. For example, the ICV 302 may be provided using one or more of an on-premise solution, and as a service solution, or as a cloud solution.

The ICV 302 may be utilized to absorb or buffer ecosystem perturbations that may arise, e.g., due to service outages, disruptions, maintenance windows, or software upgrades on the part of any other connected entity. Accordingly, the ICV 302 may effectively hide such perturbations caused by one entity from many or all of the remaining entities in the ecosystem Meanwhile, the various mobile subscribers 314-324 may take any appropriate form, including, for example, any individual, system, service, or combination thereof. A corresponding MS device may take any appropriate form. For example, such an MS device may include a mobile telephone, a handheld computer, a wearable such as a smartwatch, a pager, a radio, a TV, an audio device (including a car audio or other system), a recorder, a text-to-speech device, a barcode scanner, a personal data assistant (PDA), a sensor, or a component of the above or similar systems.

The various wireless carriers 308, 310, 312 also may be implemented in an appropriate fashion. For example, a wireless carrier may include one or more of a mobile operator (as described above with respect to FIG. 1), a landline provider, or a Wi-Fi service provider.

A service provider such as the enterprises 304, 306 may also take one or more of a number of forms. For example, such a service provider may include an element of a wireless carrier, or an element of an inter-carrier vendor, or multiple such elements working in conjunction with one another. The enterprises 304, 306 may include a third party, such as a service bureau, a provider of various online services, a merchant, a content provider (such as, for example, a news organization, or an advertising agency), a financial institution, or various combinations thereof.

In practice, the information that transits the ICV 302 may include any appropriate quanta of data. For example, such data may include an SMS message, a MMS message, an IMS message, an email message, a voice over IP data stream, a video data stream, a voice telephone call, signaling data, various forms of command and control data, an audio data stream, IM data, pictures or other static images, data from various forms of games, or data from various software applications.

As referenced above, the ICV 302 thus bridges all of the various connected entities, and may offer various capabilities, including data/protocol adaptation, routing, formatting, delivery, value ad services, and various other capabilities. Thus, the ICV 302 provides each of the wireless carriers 308-312, and, by extension, each of the mobile subscribers 314-324 that are serviced by each corresponding wireless carrier, ubiquitous access to a broad universe of service providers, including the enterprises 304, 306, and any other entities that may be connected to the ICV 302. Further, the ICV 302 provides to a service provider, such as the enterprises 304, 306, and any other entities connected to the ICV 302, with ubiquitous access to a broad universe of wireless carriers represented by the wireless carriers 308-312, and, by extension, all of the devices of the mobile subscribers 314-324 that are serviced by corresponding wireless carriers.

The ICV 302 may thus be configured to provide, in more specific examples, dynamic route selection, optimization, or other data routing techniques. The ICV 302 may be configured to dynamically alter, update, or otherwise manage various portions of the traffic that transits the ICV 302. In the case of outages, the ICV 302 is able to provide alternative communication paradigms, e.g., SMS messaging, to reach a device of the mobile subscriber. Somewhat similarly, the ICV 302 may optionally introduce alternative, replacement, or additional features or functions, including, for example, address resolution, messaging paradigms such as SMS or MMS, and additional or alternative authentication mechanisms. The ICV 302 may be configured to cache aspects of the data traffic that transits the ICV 302. As a result, the ICV 302 may be configured to improve efficiency and transit time of data traffic, and insulate against external entity failures and service interruptions.

The ICV 302 may be configured to leverage or incorporate additional types of data that may be available to one or both of the enterprises 304/306 and the wireless carriers 308/312. For example, the ICV 302 may be able to incorporate a physical location of a device, if known by a corresponding wireless carrier.

Still further, the ICV 302 may be configured to dynamically introduce or inject information into transiting traffic. For example, the ICV 302 may include advertising or other information to selected portions of the data traffic, and/or any appropriate type and number of factoid or informational elements in the various messages that transit the ecosystem of FIG. 3. The ICV 302 may be configured to dynamically generate, and persist or preserve, unique identifier values for the data traffic, and/or various ones of the entities of the example of FIG. 3.

MS device validation in FIG. 3 may include any appropriate number or type of operations or activities. For example, based on a supplied MS identifier, such as a MSISDN (mobile station international subscriber directory number), an IMSI (international mobile subscriber identity), a MDN (mobile directory number), or an E.164 value, the ICV 302 may authoritatively determine a specific WC that services the mobile device, and inquire at, or exchange interactions with, the identified WC to validate the mobile device. Validation may apply differing rules related to data access or privacy, that may be relevant or applicable, based on, e.g., such criteria as geography, or a role of a user.

Figure 4:
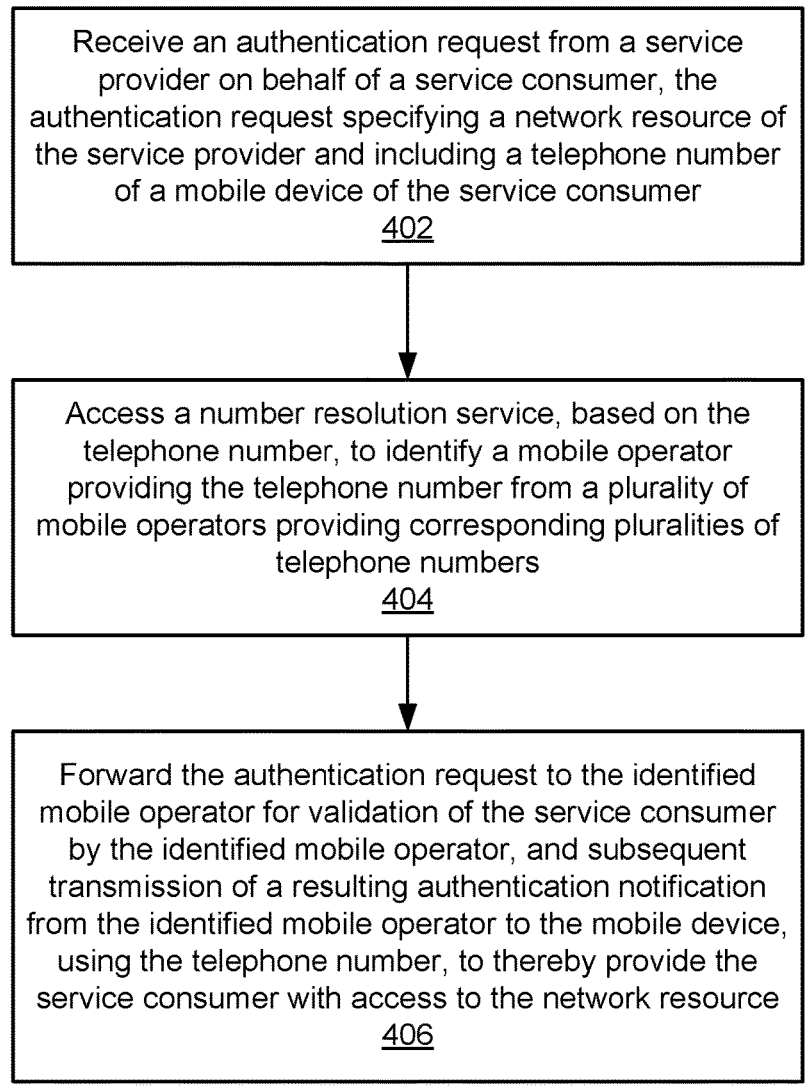
FIG. 4 is a flowchart illustrating example operations of the system of FIG. 1.

FIG. 4 is a flowchart 400 illustrating example operations of the system 100 of FIG. 1. In the example of FIG. 4, operations 402-406 are illustrated as separate, sequential operations. However, in various implementations, the flowchart 400 may include one or more additional or alternative operations, and/or one or more of the operations 402-406 may be omitted. In all such implementations, any two or more included operations or sub-operations may be performed in a partially or completely overlapping or parallel manner, or in a nested, iterative, looped, or branched fashion.

In the example of FIG. 4, an authentication request is received from the service provider on behalf of the service consumer, the authentication request specifying a network resource of the service provider and including a telephone number of a mobile device of the service consumer (402). For example, in the example of FIG. 1, the user device 104 may be utilized to access a network resource (e.g., a website and associated functionality) of the service provider 106. As may be appreciated, and as observed in the example of FIG. 3, if a mobile device is provided with network access by way of its corresponding mobile operator or other wireless carrier, then the authentication request may transit such a mobile operator en route to the service provider in question. The request handler 123 may thus receive the authentication request, e.g., from the service provider 106 in FIG. 1.

A number resolution service may then be accessed, based on the telephone number, to identify a mobile operator providing the telephone number from a plurality of mobile operators providing corresponding pluralities of telephone numbers (404). For example, in FIG. 1, within the connection hub 102, the operator discovery engine 124 may access the number resolution service 126 to determine an identified phone number and relate the identified telephone number to a corresponding mobile operator responsible for providing that telephone number.

The authentication request may then be forwarded to the identified mobile operator for validation of the service consumer by the identified mobile operator, and subsequent transmission of a resulting authentication notification from the identified mobile operator to the mobile device, using the telephone number, to thereby provide the service consumer with access to the network resource (406). For example, the operator interface 128 may interface with the hub interface 122 of the mobile operator 108, in order to convey the authentication request for the telephone number in question. Then, as already shown and described, the mobile operator 108 may directly contact the user device 104 (e.g., using the telephone number) to solicit an action from the user of the user device 104 that will complete the authentication process (an example of which was illustrated and described above with respect to FIG. 2. Once the user is authenticated for the service provider 106 in this manner, the user may be authenticated across a number of services or resources of the service provider 106, and across a number of user sessions that the user may initiate with the service provider 106 over time (e.g., the user may be able to authenticate in the future simply by clicking on an appropriate connection icon, without having to re-authenticate).

Figure 5:
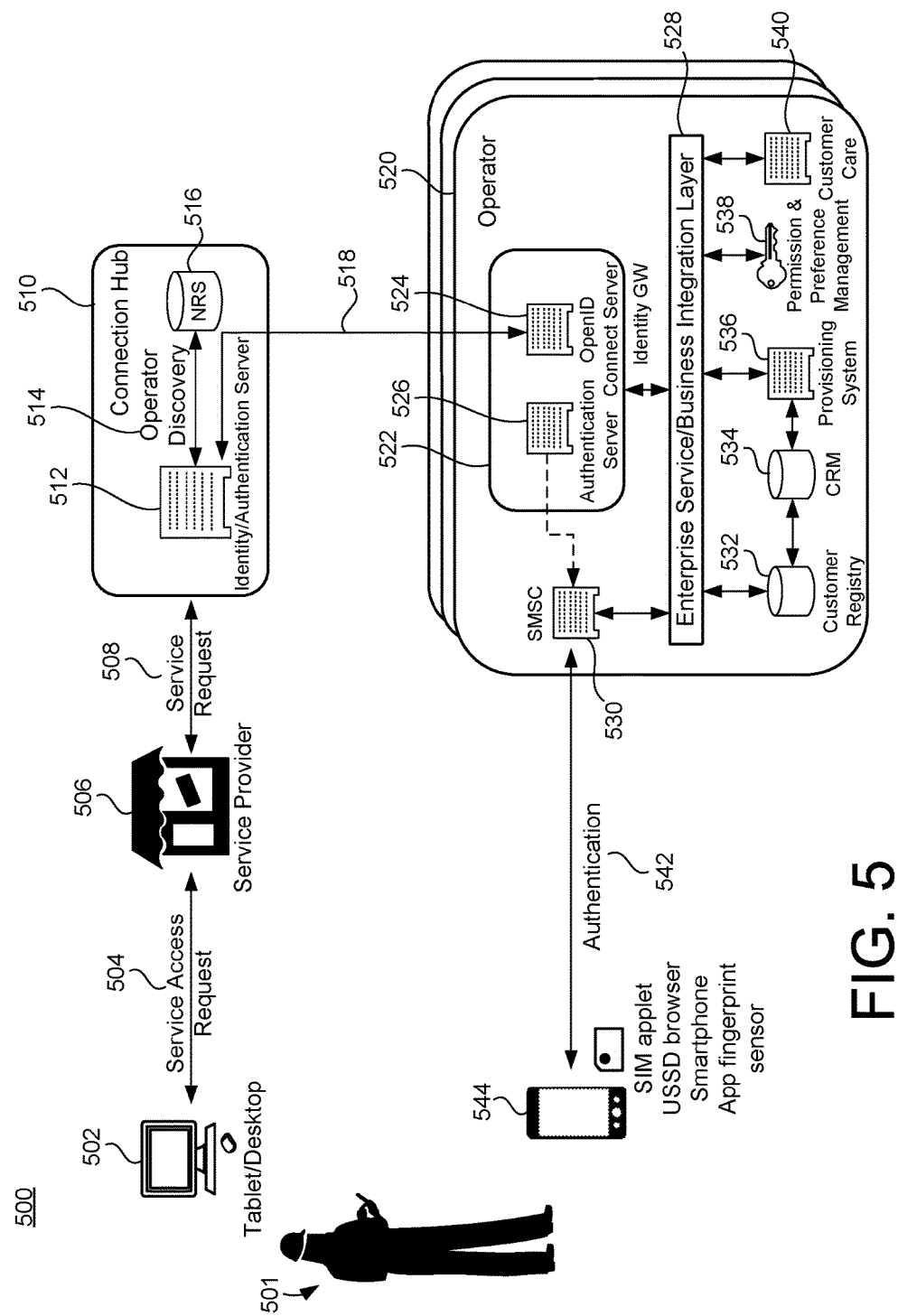
FIG. 5 is a block diagram illustrating an example implementation of the system of FIG. 1 using Mobile Connect.

FIG. 5 is a block diagram of a system 500 illustrating a more detailed example implementation of the system 100 of FIG. 1. In FIG. 5, the system 500, and the following description, provide an example implementation in which the system 100 of FIG. 1 is integrated with the Mobile Connect solution of the GSMA, which is a trade group representing a plurality of network (e.g., mobile) operators.

In the example of FIG. 5, a user 501 uses a tablet or desktop computer 502 to send a service access request 504 to a service provider 506. The service provider 506 forwards a service request 508 to a connection hub 510, corresponding to an example implementation of the connection hub 102 of FIG. 1. In the example, the service access request 504, and the service request 508, include (or otherwise provide access to) a telephone number of a mobile device 544 of the user 501.

As referenced above, the connection hub 510 may be configured to use an identify/authentication server 512 that is configured to execute an operator discovery operation using a number resolution service (NRS) 516. As described, the NRS 516 may represent or include a plurality of telephone numbers provided by a plurality of registered network/mobile operators.

The server 512 may thus utilize the telephone number of the mobile device 544 to send an authentication request 518 to a discovered operator 520 that corresponds to the provider of the mobile device 544. In more detail, the Mobile Connect architecture provides an OpenID Connect interface (API(s)) that provides an example of at least a portion of the hub interface 118 of FIG. 1.

In practice, the connection hub 510 makes it straightforward for both the service provider 506 and the operator 520 to register with, and utilize, the authentication services described herein, even when utilizing the Mobile Connect architecture, or other existing or future architecture. For example, the service provider 506 may be provided, by way of the registration engine 120, with an ability to register a developer account and access one or more existing APIs to use in constructing or supplementing a website accessed by the user 501 at the computer 502.

For example, such APIs may include a logo API for including a version of the connection icon 116 of FIG. 1 (or 206 of FIG. 2), to provide users with the corresponding authentication option. The APIs also may include APIs for specifying a level of assurance that is desired or required by the service provider 506 for different authentication operations, as referenced above and described in detail, below.

Further in the example of FIG. 5, the operator 520 is illustrated as including an identity gateway (GW) 522 that includes an OpenID Connect Server 524 and an authentication server 526. The OpenID connect server 524 should be understood to implement an instance of the hub interface 122 of FIG. 1, which in this case leverages aspects of the existing OpenConnect API of the Mobile Connect architecture. Meanwhile, the authentication server 526 may represent a standard authentication server of the operator 520, which may thus be leveraged as well during the present authentication process.

An enterprise service/business integration layer 528 provides a number of non-exhaustive, non-limiting, potential features and benefits that may be leveraged and provided by the operator 520 in the context of FIG. 5. As shown, a customer registry 532 represents a registry of all relevant customers of the operator 520, along with related, possibly relevant information for each customer. Similarly, a customer relationship management (CRM) repository 534 includes additional customer information that may be leveraged. For example, whereas the customer registry 532 may include largely static biographical or demographical information regarding customers, the CRM repository 534 may include higher-level details and analyses that may be useful, such as suggestions for future purchases, predicted customer preferences, and other decision-related data and algorithms.

A provisioning system 536 may be configured to provision available resources to the user 501 and the mobile device 544, perhaps in conjunction with the present authentication techniques. For example, data or application logic may need to be provided to the mobile device 544 to complete a desired level or type of authentication.

Permission and preference management 538 may represent a tool for, e.g., tracking preferences of the service provider 506 and/or the user 501, along with associated permissions required to access a particular network resource. Meanwhile, a customer care system 540 represents a point of contact and tracking for interfacing with customers to resolve any disputes or other issues. Although potentially standard by themselves, the various elements 532-540 accessed by the layer 528 illustrate that the operator 520 possesses a number of customer-centric resources, and that the incremental/marginal cost or burden of utilizing these in the context of the system 500 is small relative to the benefit to the operator 520. At the same time, the service provider 506 and the user 501 obtain the benefits of using the operator resources, while reducing their respective costs/burdens in obtaining authentication of the user 501.

Further in FIG. 5, a short message service center (SMSC) 530 may be utilized to interface with both the layer 528 and the identity gateway 522, and to send a resulting authentication message 542 to the mobile device 544. As referenced in the simplified example of FIG. 2, this authentication message 542 may be as simple as a request to select an icon on the mobile device 544 to complete the authentication process. Such approaches implicitly rely on the security of the possession of the mobile device 544 by the user 501, along with any other security measures the user 501 may have in place with respect to the mobile device 544 (e.g., a screenlock or local password)).

In addition, as referenced above, a number of additional or alternative authentication measures may be used, depending on preferences or requirements of any or all of the service provider 506, the operator 520, and/or the user 501 (or an employer thereof). For example, as shown, a SIM (subscriber identity module) applet, an unstructured supplementary service data (USSD) browser, or a fingerprint sensor may be used to provide different levels of assurance associated with the authentication being conducted. As may be appreciated, these and other authentication techniques may easily be integrated into the system 500 and utilized in a desired manner and to a desired extent, in a flexible and efficient manner.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one processor to:
   register a service provider at a connection hub implementing a number resolution service;
   provide the service provider with access to a connection icon for inclusion thereof within a webpage through which a service consumer accesses a network resource, the connection icon configured to generate an authentication request in response to a selection thereof by the service consumer;
   receive the authentication request from the service provider on behalf of the service consumer, the authentication request specifying the network resource of the service provider and including a telephone number of a mobile device of the service consumer;
   access the number resolution service, based on the telephone number, to identify a mobile operator providing the telephone number from a plurality of mobile operators providing corresponding pluralities of telephone numbers;
   forward the authentication request to the identified mobile operator for validation of the service consumer by the identified mobile operator, and subsequent transmission of a resulting authentication notification from the identified mobile operator to the mobile device, using the telephone number, to thereby provide the service consumer with access to the network resource;
determine, for a second authentication request and associated second telephone number, that a corresponding mobile operator is not registered for authentication of a corresponding second service consumer; and
execute a secondary authentication scheme for the second service consumer.

2. The computer program product of claim 1, wherein the authentication request is received at the service provider from a second device that is separate from the mobile device, and the telephone number is received from the service consumer via the second device for inclusion in the authentication request.

3. The computer program product of claim 1, wherein the authentication request is received at the service provider from the mobile device, and the telephone number is available at the mobile device and automatically included in the authentication request.

4. The computer program product of claim 1, wherein the instructions, when executed, are configured to cause the at least one processor to:
provide, in conjunction with the registration of the service provider, a first hub interface to the service provider that is configured to receive the authentication request from the service provider;
register the mobile operator at the connection hub; and
provide, in conjunction with the registration of the mobile operator, a second hub interface that is configured to forward the authentication request to the mobile operator.

5. The computer program product of claim 1, wherein the instructions, when executed, are configured to cause the at least one processor to:
determine a level of assurance of authentication required by the authentication request, and
provide the required level of assurance to the mobile operator in conjunction with forwarding the authentication request thereto.

6. The computer program product of claim 1, wherein the instructions, when executed, are configured to cause the at least one processor to:
generate, for the service provider, a report characterizing a plurality of authentication requests, including the authentication request, across a plurality service consumers and a corresponding plurality of mobile operators included within the number resolution service.

7. A computer-implemented method for executing instructions stored on a non-transitory computer readable storage medium, the method comprising:
registering a service provider at a connection hub implementing a number resolution service;
providing the service provider with access to a connection icon for inclusion thereof within a webpage through which a service consumer accesses a network resource, the connection icon configured to generate an authentication request in response to a selection thereof by the service consumer;
receiving the authentication request from the service provider on behalf of the service consumer, the authentication request specifying the network resource of the service provider and including a telephone number of a mobile device of the service consumer;
accessing the number resolution service, based on the telephone number, to identify a mobile operator providing the telephone number from a plurality of mobile operators providing corresponding pluralities of telephone numbers;
forwarding the authentication request to the identified mobile operator for validation of the service consumer by the identified mobile operator, and subsequent transmission of a resulting authentication notification from the identified mobile operator to the mobile device, using the telephone number, to thereby provide the service consumer with access to the network resource;
determining, for a second authentication request and associated second telephone number, that a corresponding mobile operator is not registered for authentication of a corresponding second service consumer; and
executing a secondary authentication scheme for the second service consumer.

8. The method of claim 7, wherein the authentication request is received at the service provider from a second device that is separate from the mobile device, and the telephone number is received from the service consumer via the second device for inclusion in the authentication request.

9. The method of claim 7, wherein the authentication request is received at the service provider from the mobile device, and the telephone number is available at the mobile device and automatically included in the authentication request.

10. The method of claim 7, further comprising:
providing, in conjunction with the registration of the service provider, a first hub interface to the service provider that is configured to receive the authentication request from the service provider;
registering the mobile operator at the connection hub; and
providing, in conjunction with the registration of the mobile operator, a second hub interface that is configured to forward the authentication request to the mobile operator.

11. The method of claim 7, further comprising:
determining a level of assurance of authentication required by the authentication request, and
providing the required level of assurance to the mobile operator in conjunction with forwarding the authentication request thereto.

12. The method of claim 7, further comprising:
generating, for the service provider, a report characterizing a plurality of authentication requests, including the authentication request, across a plurality service consumers and a corresponding plurality of mobile operators included within the number resolution service.

13. A system comprising:
at least one processor; and
instructions recorded on a non-transitory computer-readable medium, and executable by the at least one processor, the system including
a connection hub configured to connect a plurality of service providers and a plurality of mobile operators, and facilitate authentication of service consumers on behalf of the plurality of service providers, using authentication information of the plurality of mobile operators, to thereby enable provision of network resources from the plurality of service providers to the service consumers, the connection hub including
a request handler configured to receive an authentication request from a service provider of the plurality of service providers,
an operator discovery engine configured to access a number resolution service and match a telephone number of a mobile device of the service consumer with a corresponding mobile operator of the plurality of mobile operators, an operator interface configured to forward the authentication request to the corresponding mobile operator, for use thereby of the telephone number and the mobile device in completing an authentication of the service consumer at the service provider and associated provision of a corresponding network resource to the service consumer, wherein the connection hub further includes a registration engine configured to register each of the plurality of service providers and each of the plurality of mobile operators, including providing each with a hub interface configured to exchange the authentication request with the connection hub, and wherein the registration engine is further configured to provide each of the plurality of service providers with access to a connection icon for inclusion thereof within a webpage through which the service consumer accesses the network resource, the connection icon configured to generate the authentication request in response to a selection thereof by the service consumer, and wherein the operator discovery engine is further configured to determine, for a second authentication request and associated second telephone number received from the request handler, that a corresponding mobile operator is not registered for authentication of a corresponding second service consumer, and to forward the second authentication request and the second telephone number to a backup manager for execution of a secondary authentication scheme for the second service consumer.

14. The system of claim 13, wherein the connection hub further comprises:

a report generator configured to generate, for the service provider, a report characterizing a plurality of authentication requests, including the authentication request, across a plurality service consumers and a corresponding plurality of mobile operators included within the number resolution service.

* * * * *